Mar. 5, 1929.  F. W. SPERR, JR  1,703,967
AERATION APPARATUS AND METHOD
Filed May 7, 1926
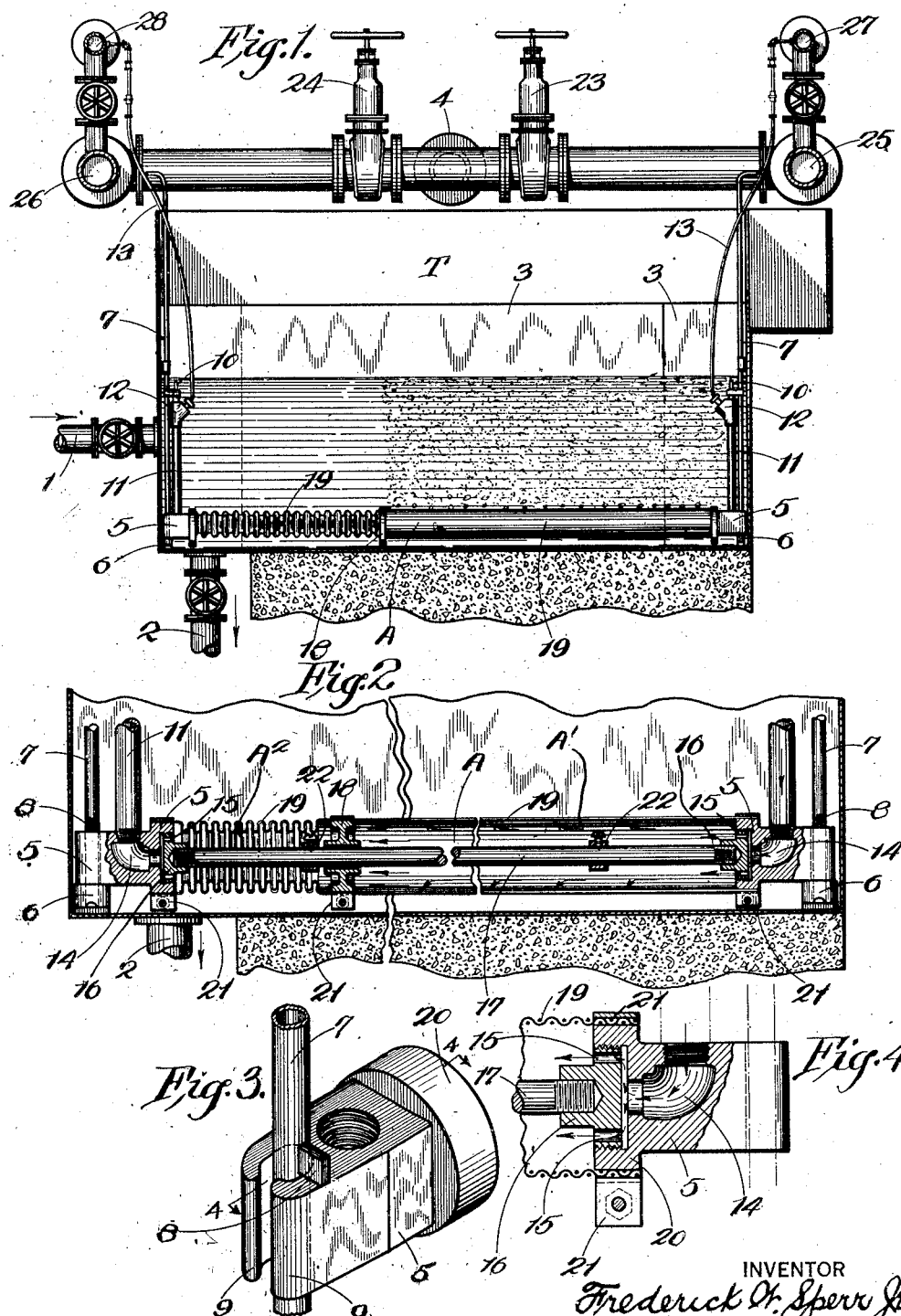
INVENTOR
Frederick W. Sperr Jr.
BY
Munday Clarke & Carpenter
ATTORNEYS Patented Mar. 5, 1929.

1,703,967

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

AERATION APPARATUS AND METHOD.

Application filed May 7, 1926. Serial No. 107,479.

The present invention relates in general to improvements in aeration of liquids, and more particularly liquids containing solid material suspended therein, and has a particular application to the aeration and revivification of sulphided gas purification liquids, especially such as contain insoluble iron or other compounds in suspension for the purpose of causing the formation of free sulphur as an end product of such aeration.

In such processes, and in fact many others, as for example the aeration of sewage and the like, the requirements and conditions imposed upon aeration means are particularly severe. The efficiency of aeration depends to a large extent upon extremely fine comminution of the air entering the liquid, and this fact has led to the adoption of various porous media, such as Filtros, earthenware, wood blocks, fabric blankets, and the like whereby a suitable, fine comminution of the air in adequate volume may be obtained. However, such media are subject, under actual operating conditions, to being clogged and "blinded" with solid material. Deposition or crystallization of solids, bacterial growths, etc. in the interstices or on the surface of the fabric of the aerators may eventually cause local stoppage in the same, causing impairment of aeration, high back pressure, frequent shut-downs for cleaning and replacement, short life of the aerators, and other annoyances and difficulties of operation. The most extreme care is desirable in order to maintain the efficiency of porous aerators, and much thought and attention has been spent upon the problem.

The most satisfactory solution of the difficulty has up to the present time resided in the vibratile tubular fabric aerators described and claimed in the copending application for United States Letters Patent of Gilbert E. Seil, Serial No. 21,978, filed April 9, 1925, to which reference is hereby expressly made. The Seil aerator consists, briefly, in a tubular canvas or other fabric body, suspended between a pair of flanges in such manner as to be vibratile under the influence of the air passing through the same. This vibration is induced partly by the agitation of the liquid and partly by the pulsation of the air pump or blower. The vibratory motion set up in the said fabric has been found to keep the fabric free from stoppages for extended periods. Thus the Seil aerator represented a distinct advance in the art, and under many conditions gives perfectly satisfactory service for long periods of time.

An object of the present invention is to provide means for causing increased motion or vibration of tubular fabric aerators, and for periodically causing the same to be loosened and rested, without cessation of aeration, so that these factors may combine to result in greater freedom from stoppages, longer life of the aerators, and uniform aeration.

In accordance with my invention, I provide an impermeable division wall or partition between the two ends of the aerator tube, said partition being so constructed as to allow free axial travel of the same to and fro from one end of the aeration tank to the other, or a part of this distance. In the illustrative embodiment of the invention the actual length of the fabric tube is preferably greater than the distance between the ends of the aeration tank, and the said partition is firmly fastened around its periphery to the tubular fabric and at about the mid-point of the tube. Thus a movement of the said partition to the left will cause the fabric on that side of the said wall to be collapsed and folded, and the fabric on the opposite side to be stretched to a point which limits the travel of the division wall, and vice versa.

Furthermore, I provide for the admission of air to the aerator from either end, in such manner as to influence the position and to effect movement of the movable partition, and I further provide means whereby air may be alternately introduced from both said ends, respectively, causing a reciprocal or forward-and-backward motion of the said partition and causing the introduced air to pass through the aerator mainly through the stretched portion thereof.

My invention further consists in such other new and useful improvements, and has for further objects such other operative advantages or results, as may be found to obtain in the apparatus hereinafter described and claimed.

In the accompanying drawings forming a part of this specification and showing for purposes of exemplification a preferred form and manner in which the invention may be embodied and practiced, but without limiting the claimed invention specifically to such illustrative instance or instances:

Fig. 1 is a vertical sectional elevational view of an aeration tank wherein is situate an aerator constructed in accordance with the present invention;

Fig. 2 is an enlarged vertical sectional elevational view of the aerator tube shown in the tank in Fig. 1;

Fig. 3 is a perspective view of a portion of the aerator shown in Figs. 1 and 2; and Fig. 4 is a vertical cross-section of the same taken on the line 4—4 of Fig. 3.

The same characters of reference designate the same parts in each of the several views of the drawings.

In general, the aeration apparatus consists of the aeration tank or chamber T, sometimes called a "Thionizer," provided with liquid inlet 1 and outlet 2, or a plurality thereof, or a plurality of such tanks which may then be regarded as compartments of the whole. The said tank T is preferably divided into a plurality of passes by the vertical baffles 3, wherein are situate the aerator A, of tubular pliable porous material, or a plurality of such aerators. Air is supplied to the said aerators A from the pressure main 4, in the manner which will be described below. The liquid to be aerated is maintained at a suitable depth in the tank or compartment T.

The aerators A are preferably mounted and secured in position adjacent and parallel to the bottom of the tank T by means of the apparatus described and claimed in the copending application of Lloyd Logan, Serial No. 119,206, filed June 28, 1926. Such means comprise the end pieces 5 resting upon the seats 6 and loosely fitting over the guide rods 7 that are equipped with lugs or keys 8 to secure and prevent vertical displacement of the said end pieces 5 until such time as the keys 8 are turned, by revolving the rods 7, to a position in line with the opening between the projections or jaws 9 of the said end pieces 5. When this is done, the end pieces and the attached aerator structure are free to rise, being assisted by their own buoyancy and any convenient lifting device which is caused to engage the handles 10 that form the upper extremities of the hollow vertical air supply pipes 11. Immediately below the handles 10 are the laterals 12, that communicate with the flexible air conduits 13.

Air entering through the said conduits 13, traverses the laterals 12 and vertical pipes 11 to enter the passages 14 in the end pieces 5, and passes through the plurality of passages 15 in the bushing 16 into tube of the body of the aerator A. The said bushings 16 are preferably screwed into the end pieces 5, and are rigidly fastened to each other by means of the straight rigid spacer rod 17, which determines the length of the aerator A. Upon the said rod 17 is loosely fitted the annular partition 18, which is free to travel along the length of the rod 17 under the influence of the aerating air, but which obstructs the passage of air from one side A' to the other side A².

The porous tubular fabric envelope 19 of canvas, chamois leather or the like, is preferably of considerably greater length than the distance between the flanged portions 20 of the end pieces 5, and is fastened at its extremities to the said flanges 20 by means of strap clamps 21. The said fabric tube 19 is also fastened, midway of its length, to the periphery of the movable piston-like partition 18, also by means of a clamp 21. Any other suitable fastening means may replace the clamps 21, as for example, tightly wound and fastened wire strands. Stops 22 are provided to limit the travel of the partition 18, but are not regarded as essential, and may sometimes be dispensed with entirely, as the place of fastening of partition 18 to the fabric 19 may determine such travel and thus serve this purpose.

Under the influence of air under pressure introduced into one end only of the aerator A, the partition 18 travels away from that side of the aerator until stopped by the length of that portion of the fabric tube 19 adjacent to the inlet side, or by one of the stops 22. In the drawings, the partition 18 is shown in the left hand position, having been forced there by air admitted from the right hand side of the aerator A; the fabric 19 to the right of the partition 18 is stretched to the normal position, and is diffusing air into the liquid within the tank T, while the other and left hand portion of the tube 19 has collapsed into folds, which for convenience, are shown rather more regularly than might actually be true. The action is thus seen to be somewhat similar to that of an accordion, and the aerator has thus been colloquially designated as an "accordion tube". As shown, valve 24 is assumed to be closed, and valve 23 is open, compressed air passing into the header 25 which serves a plurality of tanks or compartments T, the subheader 27, of which there is preferably one for each end of each compartment T, and flexible air connection 13, into the aerators A. By reversing the positions of the valves 23 and 24, the air is caused to enter the opposite sides of the aerators A, and the active and folded zones of the said aerators are thus reversed.

Under normal operating conditions, the flow of air to the opposite ends of the aerators is reversed at convenient intervals, manually or automatically, and thus a reciprocal motion of the piston-like partitions 18 between the non-communicant compartments of the aerators is set up. This may be intermittent or continuous, as desired. Thus, while all portions of the tubular fabric body are, at some interval or another, deflated and collapsed, yet practically the same aerating area is functioning during the entire period of operation, and this area is the greater portion of the total length of the aerator.

When it is particularly desired to prevent infiltration of liquid into the collapsed portions of the aerators, the air supply to such portions may be continued thereto but restricted and reduced to a flow less than the flow of air into the inflated portions, to any degree, instead of cutting off the said flow entirely.

My improved aerator is vibratile even as the aerator described and claimed by Seil above noted are vibratile, and are additionally capable of this collapsing action, which I have found to have a very favorable effect upon the useful life and working performance of the said aerator cloths.

In the instance described above, I have shown that the reversal of the air supply may be effected manually, by operating valves 23 and 24 as desired. I may, however, otherwise accomplish such reversal, as for example by any simple automatic reversing device adapted to this purpose, which thus renders the operation entirely automatic. I may also provide other means of supporting the tubes in the tank, and for removing the same therefrom, consistent with the operation of my invention.

My invention provides an aerator remarkably free from stoppages, when used in the aeration of suspensions, sulphided liquids, sewage, and under similarly severe conditions. The manipulation thereof is simple and convenient, and results in a more efficient operation of aeration processes of this character. Furthermore, the actual operating costs of aerating and maintaining the aerators in useful service are materially reduced.

The invention as hereinabove set forth is embodied in particular form but may be variously embodied within the scope of the claims hereinafter made.

I claim:

1. A pliable porous fabric aerator divided into two compartments by a movable partition adapted to be reciprocally actuated, said aerator having an inlet for compressed air at its opposite ends the fabric of each compartment being adapted to be alternately expanded and folded by the action of compressed air introduced in alternation to the opposite ends of said aerator.

2. A pliable porous fabric aerator comprised of two portions separated from each other by a movable partition adapted to be reciprocally actuated, said partition causing collapse of said portions in alternation.

3. An aerator as claimed in claim 2, and in which the reciprocal movement of the partition is effected by means of air under pressure introduced to said aerator at opposite sides of said partition in alternation.

4. A method of operating tubular vibratile aerators which consists in: constituting each of said aerators of complementary portions and inflating and collapsing the portions in alternation.

5. A method of operating tubular vibratile aerators which consists in: constituting each of said aerators of complementary portions and inflating and collapsing the portions in alternation while preserving a uniform aeration area and length of the whole.

6. In an aerator for aerating liquids, in combination: a plurality of separate compartments each constituted of a tubular pliable porous fabric body and means operable for alternately collapsing and inflating any or all of said compartments while submerged in the liquid being aerated.

7. In an aerator for aerating liquids, in combination: a pliable, tubular porous fabric; movable means extending transversely within the tubular fabric for dividing the chamber within the fabric into two portions; and actuating means operable to apply pressure to said movable means to actuate the same reciprocally.

8. Apparatus as claimed in claim 7, and in which the actuating means is operable to introduce air in alternation into said portions of the aerator to effect the reciprocal movement of the said movable means.

9. In an aerator for aerating liquids, in combination: a pliable tubular porous fabric; movable impermeable means for dividing the said fabric into two non-communicant portions; said means being mounted to move reciprocally along the longitudinal axis of the aerator under the influence of air introduced into the said non-communicant portions of the latter in alternation; and means for so introducing the air.

10. In combination with a pliable porous fabric aerator: movable means between and connected with portions on two opposite sides thereof and movable therewith; valve controlled means operable to supply air to the portions of the fabric on either side of said movable means and cause a portion of said aerator to collapse while air is diffusing through another portion thereof.

11. An aerator for aerating liquids, comprising, in combination: a pair of end flanges situate opposite each other; a rigid axial member connecting the said flanges: an annular partition of substantially the same diameter as said end flanges and mounted for movement along said rigid member; a porous tubular fabric envelope longer than the said rigid member and tightly fastened at each end to said flanges and similarly fastened between said ends to said movable partition: and means for introducing air to the opposite ends of the said aerator in alternation; whereby to permit said movable partition to reciprocate along the said rigid member under the influence of air introduced to the said aerator.

12. A method of diffusing gas as finely comminuted gas consisting in diffusing such gas through an individual compartment constituted of a porous medium, and, while so doing, deflating another individual compartment constituted of a porous medium.

13. A method of diffusing gas as finely comminuted gas consisting in diffusing such gas through a porous medium and, while doing so, deflating and inflating portions of said medium in alternation with each other.

14. A method of diffusing gas as finely comminuted gas, consisting in: diffusing such gas through a porous medium and simultaneously deflating and folding a portion of said medium while inflating another portion of the same medium.

15. A method of operating tubular vibratile porous diffusing members which consists in: diffusing through an inflated portion of said tube while another portion is deflated, then deflating said inflated portion and inflating and diffusing through said other portion.

In testimony whereof I have hereunto set my hand.

FREDERICK W. SPERR, Jr.